Aug. 20, 1940.　　　A. H. LUHRMAN　　　2,212,070
PASTING MACHINE FOR BATTERY GRIDS
Filed Aug. 9, 1937　　　4 Sheets-Sheet 1

INVENTOR.
ALBERT H. LUHRMAN.
BY
ATTORNEY.

Aug. 20, 1940.  A. H. LUHRMAN  2,212,070
PASTING MACHINE FOR BATTERY GRIDS
Filed Aug. 9, 1937    4 Sheets-Sheet 4
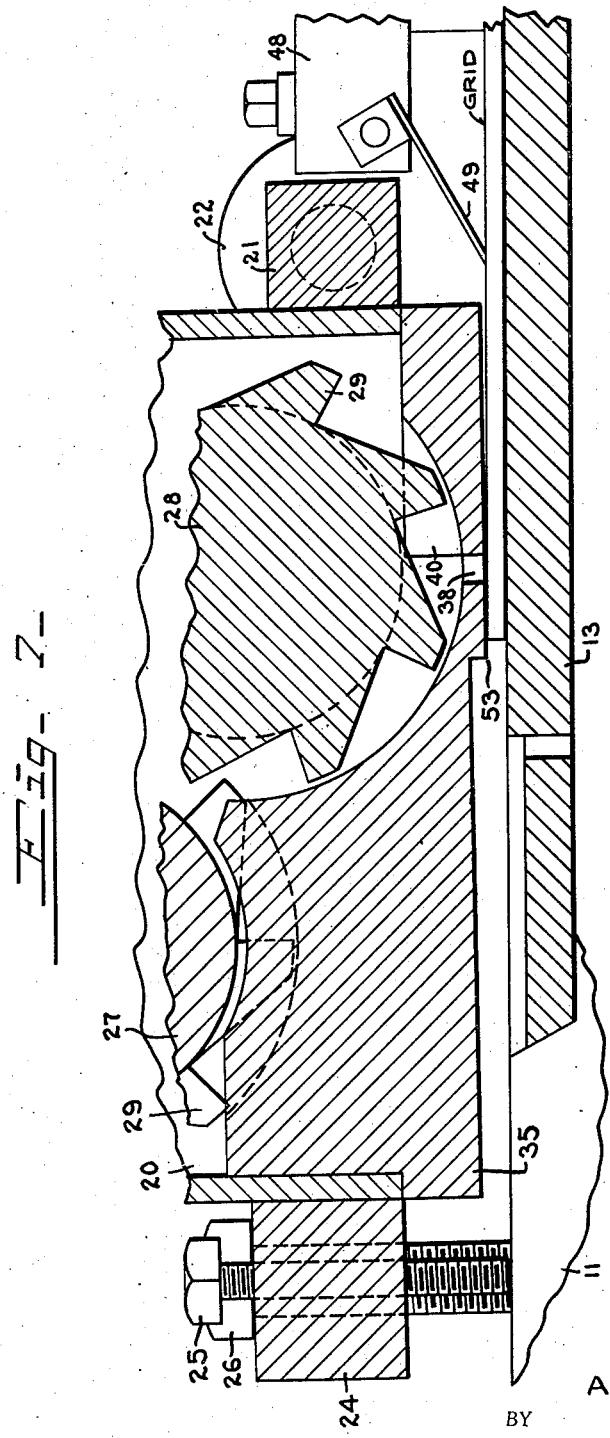
INVENTOR.
ALBERT H. LUHRMAN.
BY
*H.C. Karl.*
ATTORNEY.

Patented Aug. 20, 1940

2,212,070

UNITED STATES PATENT OFFICE 2,212,070

PASTING MACHINE FOR BATTERY GRIDS

Albert H. Luhrman, Cincinnati, Ohio

Application August 9, 1937, Serial No. 158,056

13 Claims. (Cl. 226—39)

My invention relates to improvements in means for applying a paste-like compound which forms the active components of a battery to battery grid plate and relates more particularly to the hopper construction for applying the paste to the grids without overpasting or a waste of material.

It is desirable in machines of this character that they operate at a high speed and that the entire interstices of the grid plate be completely filled with the paste compound and that this compound be pressed into the openings in the plate to create as firm an active material as possible.

It is the object of my invention to provide in a pasting machine a hopper construction for holding the paste compound and means therein for forcing the paste into a pasting zone where it is applied to the grid. A further object is to provide the hopper with an inclined pasting face whereby the plates after being pasted can be wedged and reduced to an exact thickness. A further object is to provide rollers within the hopper having alternating grooves and extending fingers with the respective rollers having their respective fingers and grooves in staggered relation to each other. A further object is to provide additional crushing rollers above the feed rollers for crushing and kneading the paste being fed to the feed rollers. A further object is to apply heat to the crushing rollers to maintain the paste material in a heated condition. A further object is to provide a moistening pad in contact with the movable table of the machine for lubricating the lower face of each grid plate prior to its being pasted.

My invention will be further readily understood from the following description and claims and from the drawings, in which latter:

Fig. 7 is an enlarged accentuated detail section of the hopper base.

Figure 1:
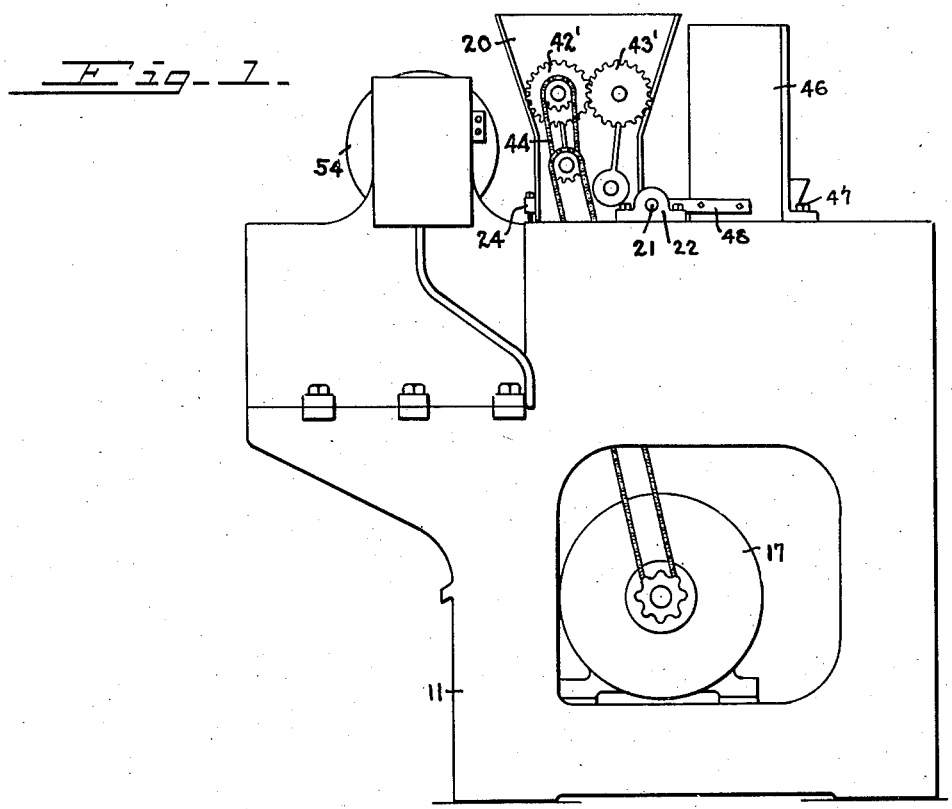
Fig. 1 is a side view of my improved machine.
Figure 2:
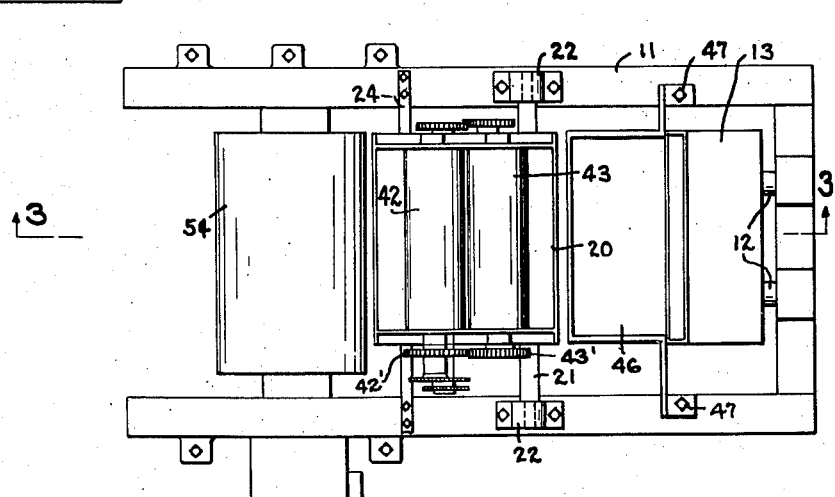
Fig. 2 is a plan view of the same.
Figure 3:
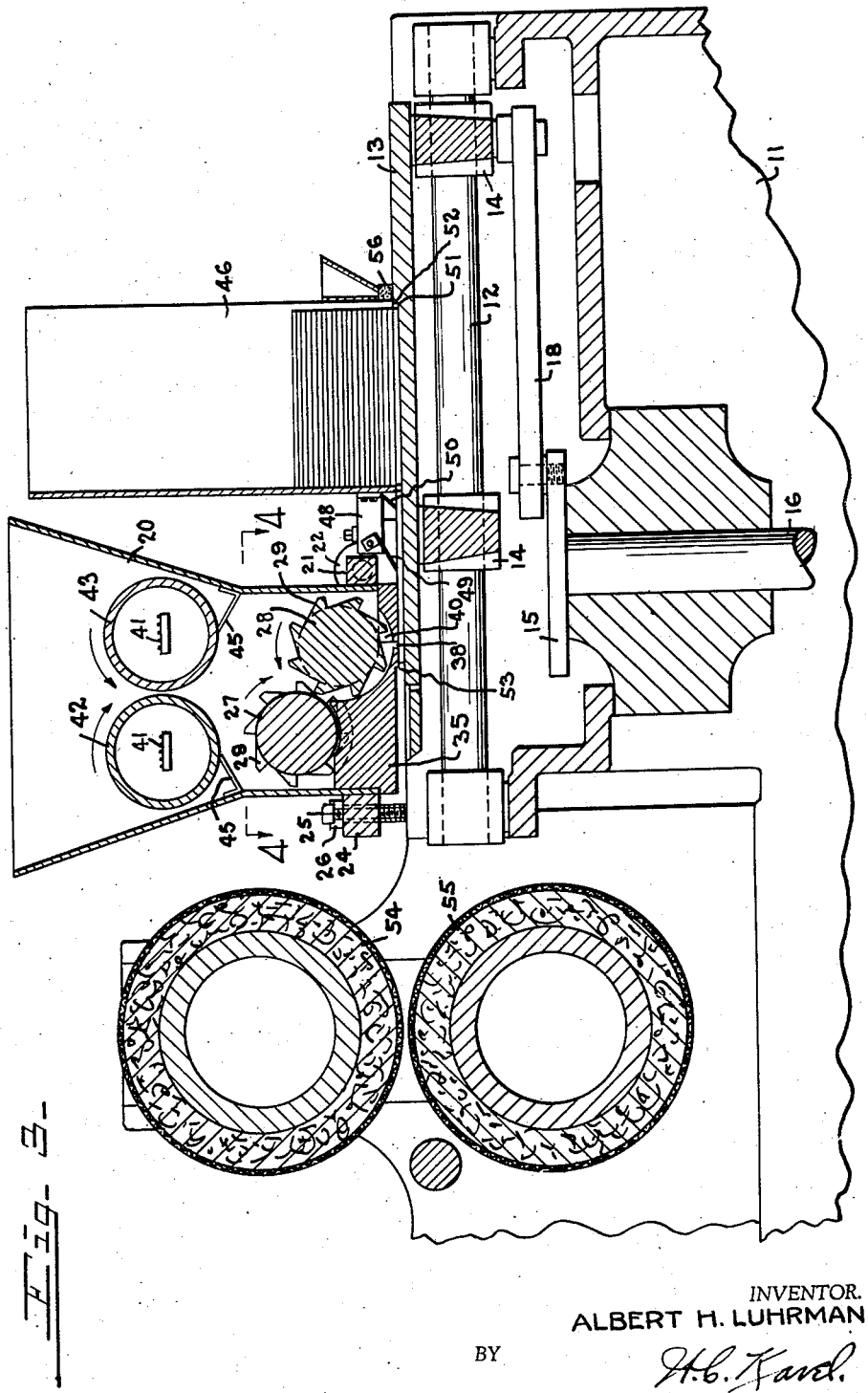
Fig. 3 is a longitudinal section of a portion of the machine, taken in the plane of the line 3—3 of Fig. 2.
Figure 4:
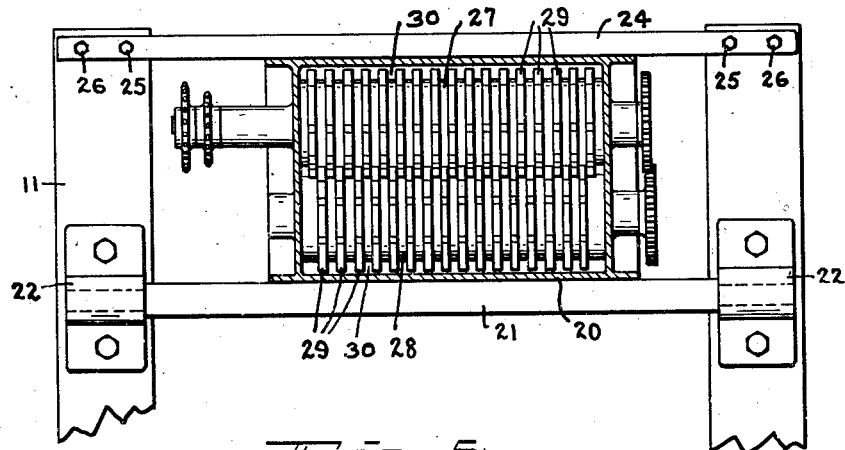
Fig. 4 is a horizontal section of the hopper, taken in the plane of the line 4—4 of Fig. 3.
Figure 5:
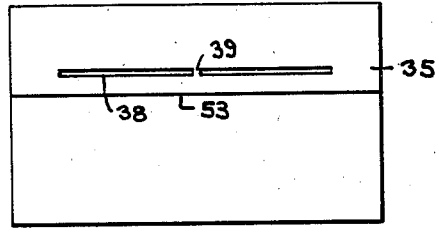
Fig. 5 is a plan view of the bottom of the hopper.
Figure 6:
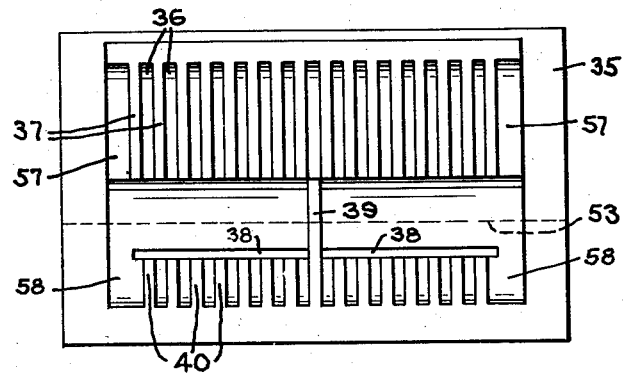
Fig. 6 is a plan view of the bottom of the hopper viewing the same from the inside of the hopper.

My improved machine comprises a frame 11 having guide rods 12 suitably mounted therein, on which a table 13 is arranged to be reciprocated. The table 13 is provided with bearings 14 about the rods 12. Suitable means are provided for reciprocating the table which comprises a rotating disc 15 secured to a shaft 16, which in turn is suitably driven through gearing not shown, by an electric motor 17. A link 18 pivoted to the disc 15 is connected to the bearing 14 for causing reciprocation of the table.

A hopper 20 is supported above the table 13, having a cross bar 21 on one side of the hopper and being journaled in bearings 22 on the frame 11. A bar 24 is secured to the other side of the hopper and has locating bolts 25 threaded therein for raising or lowering the forward end of the hopper and bolts 26 for clamping the hopper in adjusted position.

Within the hopper there are a pair of rollers 27, 28, rotatable in opposite directions and being provided with a series of lugs or fingers 29 having grooves 30 between each peripheral set of lugs. The rollers are positioned in the hopper whereby the lugs on one roller will line with the grooves on the other roller to force the paste being drawn between the rollers down into the bottom portion of the hopper. The bottom 35 of the hopper is formed to conform to the peripheral shape of the rollers and has grooves 36 for the lugs of the roller 27 with ribs 37 extending into the grooves of the roller 27 for causing the paste being carried downward by the roller 27 to move into the path of the lugs on the roller 28, whereby it is carried to the pasting zone or opening 38 extending crosswise of the machine.

The opening 38 extends the width of the area of the grid it is desired to paste. Gride plates are usually cast in pairs and pasted in pairs before being detached from each other. Therefore, I provide a rib 39 central of the opening 38 to prevent paste from being applied to the area of the grid plates at their juncture. Ribs 40 in the bottom 35 enter the grooves in the roller 28 and force the paste being brought downward by the roller 28 into the slot 38. A pair of rollers 42, 43 are positioned in the hopper above the rollers 27 and 28 and are suitably driven by means of intermeshing gears 42', 43', and a chain 44 from the shaft of the roller 27. These rollers are positioned comparatively close together to cause a crushing of the paste that is fed to the rollers 27 and 28. Scraper blades 45 remove the paste from the rollers and feed it to the pasting rollers. Suitable heating elements 41 are placed within the rollers 42 and 43 to maintain the rollers in a heated condition for maintaining the paste being fed between the rollers in a heated condition, as I have found that maintaining the paste in a heated stage a better looking plate is secured and drying of the finished plate is accelerated.

While I have shown electric heating elements within the rollers, it is understood that any suitable heating medium may be used to maintain the rollers at the desired temperature. In the rear of the hopper 20 is a suitable grid rack 46, wherein a plurality of grid plates can be stacked. This rack 46 is attached to the frame 11 by means of bolts 47 and has a pair of arms 48 to which holding clips 49 and 50 are attached.

The reciprocating table 13 is provided with a recess portion 51 which, when in a rearward position, is in back of the lowermost plate in the rack 46. As the table moves forward the shoulder 52 contacts the lowermost plate in the stack, moving the grid plate forward under the clips 49 and 50 to a position under the hopper 20. As the table reciprocates another plate is moved from the lower portion of the stack of grids in the rack 46 and abuts the plate there ahead for moving both plates forward in the machine. The pasting surface of the hopper is set at an angle to the surface of the grid being pasted by adjustment of the bolts 25 and 26, which raise or lower the forward end of the hopper relative to the pivotal connections 21 and 22. The bolts 25 and 26 are adjusted with the base of the hopper lower at the output end of the machine thus forming an inclined face to allow a slight excess of paste to be applied to the grid at the slot position. This excess paste is wedged into the interstices of the grid by the hopper surface as the grid is carried along by the table until it is cut by the sharp scraping edge 53 on the bottom of the hopper, which being set at a slight angle wedges and cuts the upper surface of the pasted grid plate for reducing that surface to the exact thickness desired. As the plate is moved forward it is carried on the forward edge of the table to a pair of rollers 54 and 55, which are held under tension for removing the plates from the table and carrying finished plates forward to a suitable conveying mechanism not shown herein.

A pad 56 is secured to the rearward wall of the rack 46 and has suitable means connected therewith for maintaining the pad in a moistened condition for applying moisture to the top surface of the rearward portion of the table 13. The use of this pad is particularly desirable when using a rather dry paste. Thus the table as it moves the grid forward, the moistened portion of the table will wipe the lower face of the next grid plate and cause that grid plate to be lubricated on its lower face to facilitate the moving of the grid through the machine and assisting the comparatively dry paste to fill the bottom side of the grid. The reciprocating table not only moves the plates forward through the machine but also on its return stroke wipes the lower face of the grid giving the grid a true finish and in conjunction with the cutting edge 53 reduces the plate to an exact size. The clips 49 and 50 hold the grids in a stationary position while the table reciprocates in a rearward direction.

I also provide enlarged grooves 57 and 58 adjacent the ends of the rollers in the bottom plate to provide an escape of any excess paste material that is carried to the opening 38 as such material will be carried by the lugs on the respective rollers upwardly into the hopper. Suitable means are provided for driving the respective rollers, which means are more clearly shown in my co-pending application Serial No. 70,411, filed March 23, 1936, Patent No. 2,175,943, October 10, 1939.

Having thus fully described my invention, what I claim as new and desire to secure by Letters Patent, is:

1. A hopper for a grid pasting machine provided with a wedging pasting wall, a transverse slot in said wall forming a grid pasting zone, an offset in said wall beyond said zone and means for forcing paste into said zone.

2. A hopper for a grid pasting machine provided with a wedging pasting wall, a transverse slot in said wall forming a grid pasting zone, means for forcing paste into said zone and said wall having an offset the edge of which forms a rigid cutter.

3. In a grid pasting machine, the combination of a reciprocating support, a hopper provided with a pasting wall set at an angle to said support, a transverse slot in said wall forming a grid pasting zone, means for forcing paste into said zone, the rear edge of said wall forming a rigid cutter and said reciprocating support passing grid plates past said zone.

4. In a grid pasting machine, a hopper, a pair of rollers in said hopper having a plurality of spaced lugs about the periphery thereof, circumferential grooves between said lugs, said rollers set in staggered relation to each other whereby the lugs on one roller will line with the grooves on the other roller, a pasting zone below one of said rollers and means on the bottom of said hopper for forcing the paste from said roller into said zone.

5. In a grid pasting machine, a hopper, a pair of rollers in said hopper having a plurality of spaced lugs about the periphery thereof, circumferential grooves between said lugs, said rollers set in staggered relation to each other whereby the lugs on one roller will line with the grooves on the other roller, a pasting zone below one of said rollers, means on the bottom of said hopper for forcing the paste from said roller into said zone, and by-passes in said bottom to permit the excess paste to move upwardly into said hopper.

6. In a grid pasting machine, a hopper, a pair of rollers in said hopper having a plurality of spaced lugs about the periphery thereof, circumferential grooves between said lugs, said rollers set in staggered relation to each other whereby the lugs on one roller will line with the grooves on the other roller, a pasting zone below one of said rollers, means on the bottom of said hopper for forcing the paste from said roller into said zone, a pair of crushing rollers above said first-named rollers, and means for lubricating the grid.

7. In a grid pasting machine having a frame, a grid support, a hopper pivoted at one end to said frame, means at the other end of said hopper for positively positioning the hopper in an angular position relative to said support, a restricted pasting zone in said hopper adjacent to said support, and a scraping edge on said hopper.

8. In a grid pasting machine having a frame, a grid support, a hopper, one end of said hopper pivoted to said frame, means on said hopper for positively raising and lowering the other end of said hopper, a pasting face on said hopper, a narrow opening in said face, and a scraping edge on said face adjacent to said opening.

9. In a grid pasting machine having a frame, a hopper pivoted on said frame, means for raising and lowering one end of said hopper for adjusting the angular position of the pasting side of said hopper, a pasting zone in the pasting side of said hopper, a scraping edge on said hopper, means in said hopper for forcing paste into said zone and means for lubricating the grid plate prior to the pasting operation.

10. In a grid pasting machine having a frame, a hopper pivoted on said frame, means for adjusting the angular position of the pasting side of said hopper, a pasting zone in said hopper, a scraping edge on said hopper, means in said hopper for forcing paste into said zone, and means on said frame for lubricating the grid plate prior to the pasting operation.

11. In a grid pasting machine having a frame, a grid support, a hopper, one end of said hopper pivoted to said frame, means on said hopper for positively raising and lowering the other end of said hopper, a pasting face on said hopper, a narrow opening in said face, means in said hopper for forcing paste into said opening, and a scraping edge on said face adjacent to said opening.

12. In a grid pasting machine, a pair of opposed flat surfaces, an offset in one of said surfaces intermediate thereof, means for changing the plane of one of said surfaces, means for locking said surface in said adjusted plane, a pasting opening in said surface having said offset in advance thereof, and means on one of said surfaces for feeding grid plates past said opening.

13. In a grid pasting machine, a pair of opposed flat surfaces, means for changing the plane of one of said surfaces, means for locking said surface in said adjusted plane, a paste supplying opening in one of said surfaces, means on the other of said surfaces for feeding grid plates past said opening, and an offset in the surface having the opening beyond said opening for scraping said grid plate.

ALBERT H. LUHRMAN.